United States Patent [19]

Mahan et al.

[11] 4,379,579
[45] Apr. 12, 1983

[54] AUTOMATIC LOCKING AND EJECTING HOOK ASSEMBLY

[75] Inventors: Richard S. Mahan, Cuyahoga Falls; Paul G. Tritt, Norton, both of Ohio; James H. Ward, Jr., Plymouth, N.C.

[73] Assignee: The B. F. Goodrich Company, Akron, Ohio

[21] Appl. No.: 331,120

[22] Filed: Dec. 16, 1981

[51] Int. Cl.³ .......................... B66C 1/38; A44B 13/00
[52] U.S. Cl. ..................... 294/83 R; 24/233; 24/241 SB
[58] Field of Search ............... 24/233, 234, 241 SB, 24/241 SP, 232 G; 294/83 R, 75

[56] References Cited

U.S. PATENT DOCUMENTS

| | | | |
|---|---|---|---|
| 1,576,197 | 3/1926 | Kuffel et al. | 294/83 R |
| 1,879,168 | 9/1932 | Freysinger | 24/241 SB |
| 2,413,392 | 12/1946 | Vieverka | 24/233 |
| 2,595,450 | 5/1952 | Coffing | 294/83 R |
| 3,144,697 | 8/1964 | Rosenberg | 24/233 |
| 3,539,217 | 11/1970 | Szekely | 294/83 R |
| 3,918,758 | 11/1975 | Fournier | 24/233 |

Primary Examiner—Paul J. Hirsch
Attorney, Agent, or Firm—H. F. Pepper, Jr.

[57] ABSTRACT

A supported ring (11) is locked in the load retaining eye (12) of a hook by a locking jaw (14) carried by a rotatable cam (44) which holds the locking jaw (14) in the locking position by engagement with a releasable latch (50). The locking position is maintained by a coil spring (64) connecting the latch (50) and cam (44). A lanyard (70) is connected to the releasable latch (50) for disengaging the locking edge (56) of the latch (50) from the cam (44) to arm the hook assembly (10). The spring (64) also urges a cam ejecting surface (48) against the load carrying ring (11) and maintains pressure on the ring (11) after arming so that when the load is released the ring (11) will be ejected from the eye (12). The lanyard (70) extends from the releasable latch (50) to the cam (44) where it is engageable with the cam (44) for manual rotation of the cam (44) to eject the ring (11) in the event of spring (64) failure.

9 Claims, 5 Drawing Figures

AUTOMATIC LOCKING AND EJECTING HOOK ASSEMBLY

BACKGROUND OF THE INVENTION

This invention relates to a hook assembly which is especially adapted for use on davit launched inflatable life rafts for the emergency evacuation of personnel from ships and offshore oil drilling platforms. The hook assembly engages a raft lifting davit ring which must be locked in place until a load is applied on the hook. It is then desirable to unlock the ring and provide for ejecting of the ring when the load on the ring is approximately equal to zero as when the raft touches the water surface. At this time it is important that the ring be ejected as soon as the load is taken off the ring so that the raft will not be jerked up and down by the waves which could cause the raft to capsize or be damaged. There have been problems with hook release gear used heretofore. For example, one hook assembly has a movable load supporting jaw with the full load transmitted to a single hinge pin extending between side plates and this has resulted in a load concentration on the hinge pin and side plates which has caused problems with deformation of the pin and plates.

SUMMARY OF THE INVENTION

The present invention provides a hook assembly in which the load is transmitted to solid side plates making possible an increased load capacity. A movable locking jaw, which does not carry the load, is also provided and is movable into locking position over the load retaining eye of the hook assembly. The locking jaw is locked in position until the hook assembly is armed, usually after the life raft is loaded. After arming of the hook assembly a spring exerts pressure on a cam supporting the locking jaw, urging the jaw out of the locking position. The cam also has an ejecting surface which is urged against the davit ring by the spring with a force which is not sufficient to remove the ring while loaded but will eject the ring as soon as the raft touches the water surface and the load is removed. The lanyard for arming the hook assembly also may be used to manually move the cam ejecting surface into engagement with the davit ring and eject it from the hook assembly.

DETAILED DESCRIPTION

Figure 1:
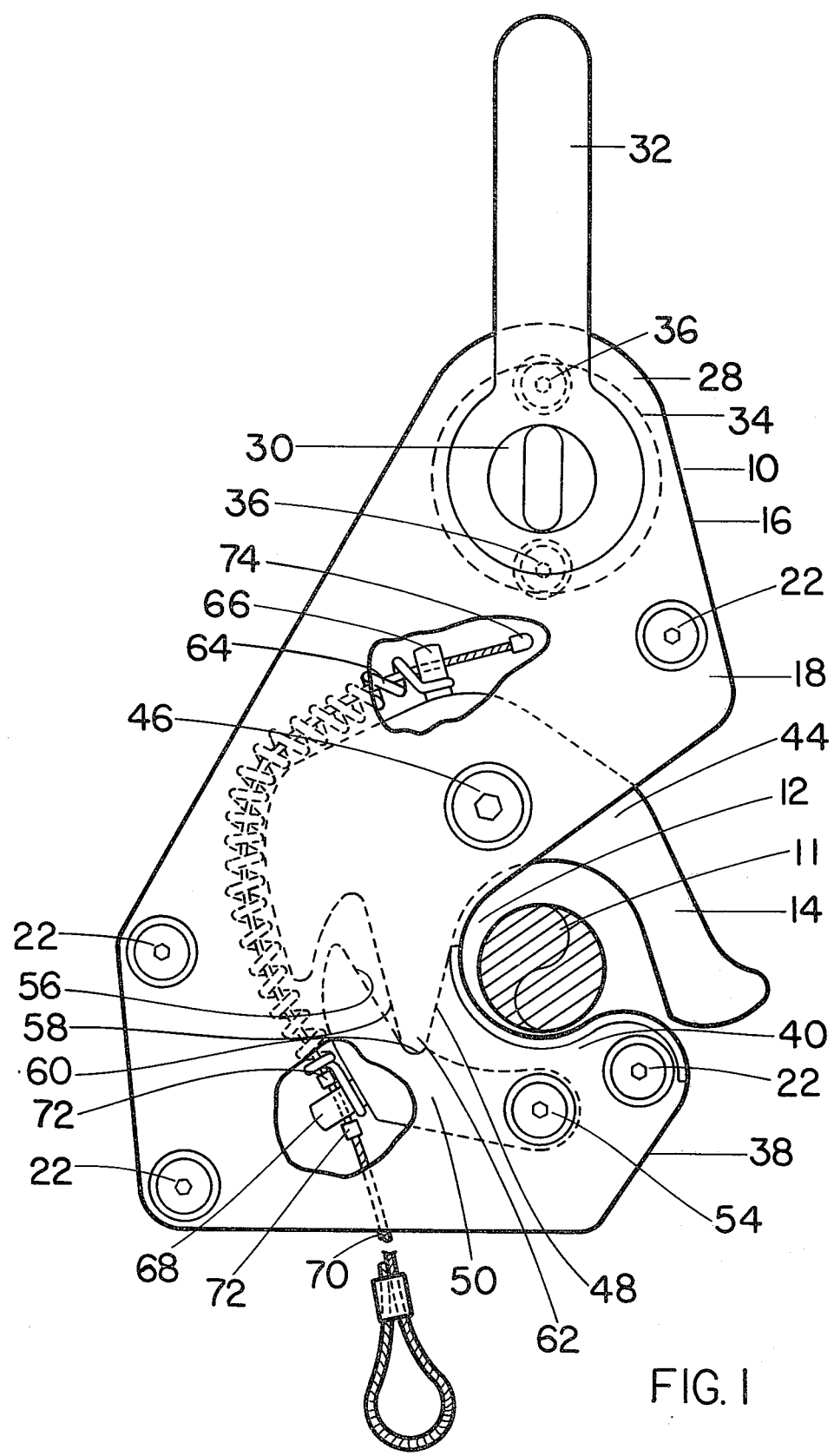
FIG. 1 is an elevation of the hook assembly embodying the invention with parts broken away to show the lanyard and spring connections to the cam and release latch in the locked position of the assembly. This view includes a fragmentary sectional view of the davit ring.
Figure 2:
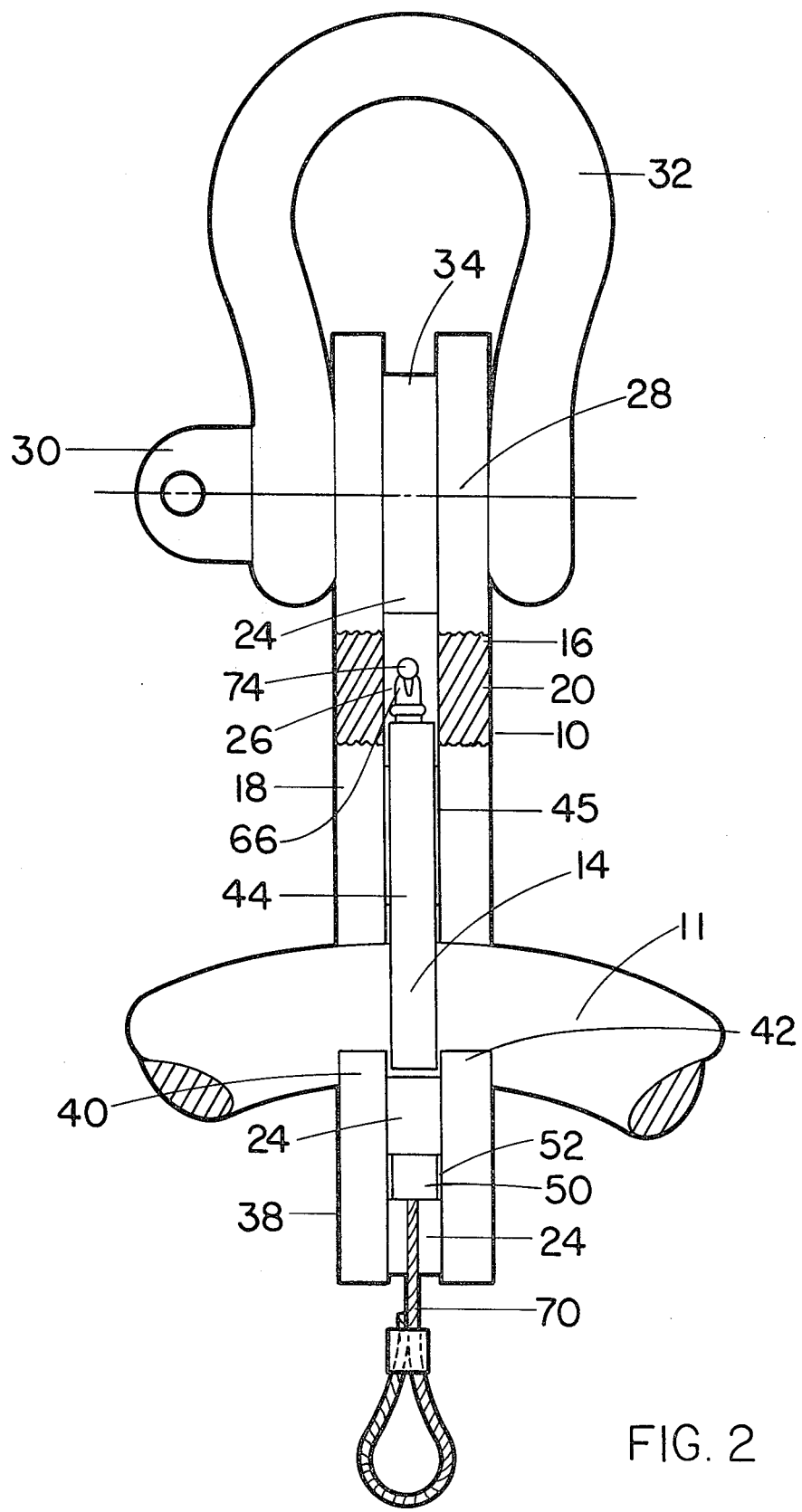
FIG. 2 is an end view of the hook assembly taken along the line 2—2 of FIG. 1 and includes a fragmentary view of the davit ring.

An automatic hook assembly 10 is shown in FIGS. 1 and 2 in the locked condition. A davit ring 11 is shown supported in hook retaining eye 12 of the assembly 10 with a locking jaw 14 in a locking position for retaining the ring in the eye.

The hook assembly 10 has a hook body or frame 16 which includes parallel side plates 18 and 20 held in spaced relation by screws 22 extending through side plate 18 and threaded in side plate 20. Cylindrical spacers 24 are positioned around the screws 22 and between the side plates 18 and 20 providing a slot 26 between the side plates. A hook supporting portion 28 of the assembly 10 has aligned holes in the side plates 18 and 20 for receiving a pin 30 of a shackle 32 suitable for fastening to the fall of the life raft davit (not shown). A shackle spacer 34 having a hole for the shackle pin 30 and having a thickness the same as the width of the slot 26 is disposed between the side plates 18 and 20 with a hole in the shackle spacer coaxial with the holes in the side plates. The shackle spacer 34 may be secured in place by screws 36 extending through the side plate 18, the shackle spacer 34 and threaded in the side plate 20. A hook portion 38 of the hook assembly 10 is disposed at a spaced-apart position from the hook supporting portion 28 and has stationary hook jaws 40 and 42 on side plates 18 and 20, respectively.

A locking and ejecting cam 44 is pivotally mounted on a bushing 45 or other friction reducing member supported on a screw 46 positioned between the side plates 18 and 20 on the frame 16 between the hook portion 38 and hook supporting portion 28. The screw 46 extends through the side plate 18 and is threaded in the side plate 20. The cam 44 includes the locking jaw 14 which is movable from a locked position shown in FIG. 1 to the released position shown in FIG. 5. The cam 44 also includes an ejecting surface 48 which is movable from a retracted position shown in FIG. 1 to an ejecting position shown in FIG. 5.

The cam 44 is held in the locking position with the locking jaw 14 depressed as shown in FIG. 1 by a releasable latch 50 pivotally mounted between the side plates 18 and 20 on a bushing 52 supported by a screw 54. The latch 50 has a locking edge 56 engageable with an edge surface 58 of the cam 44 to the lock the locking jaw 14 in the locking position. The locking edge 56 may have an indentation 60 which is engaged by a projection 62 on the edge surface 58 of the cam. The side plates 18 and 20, the cam 44 and latch 50 are preferably of steel or other suitable high strength material.

Figure 3:
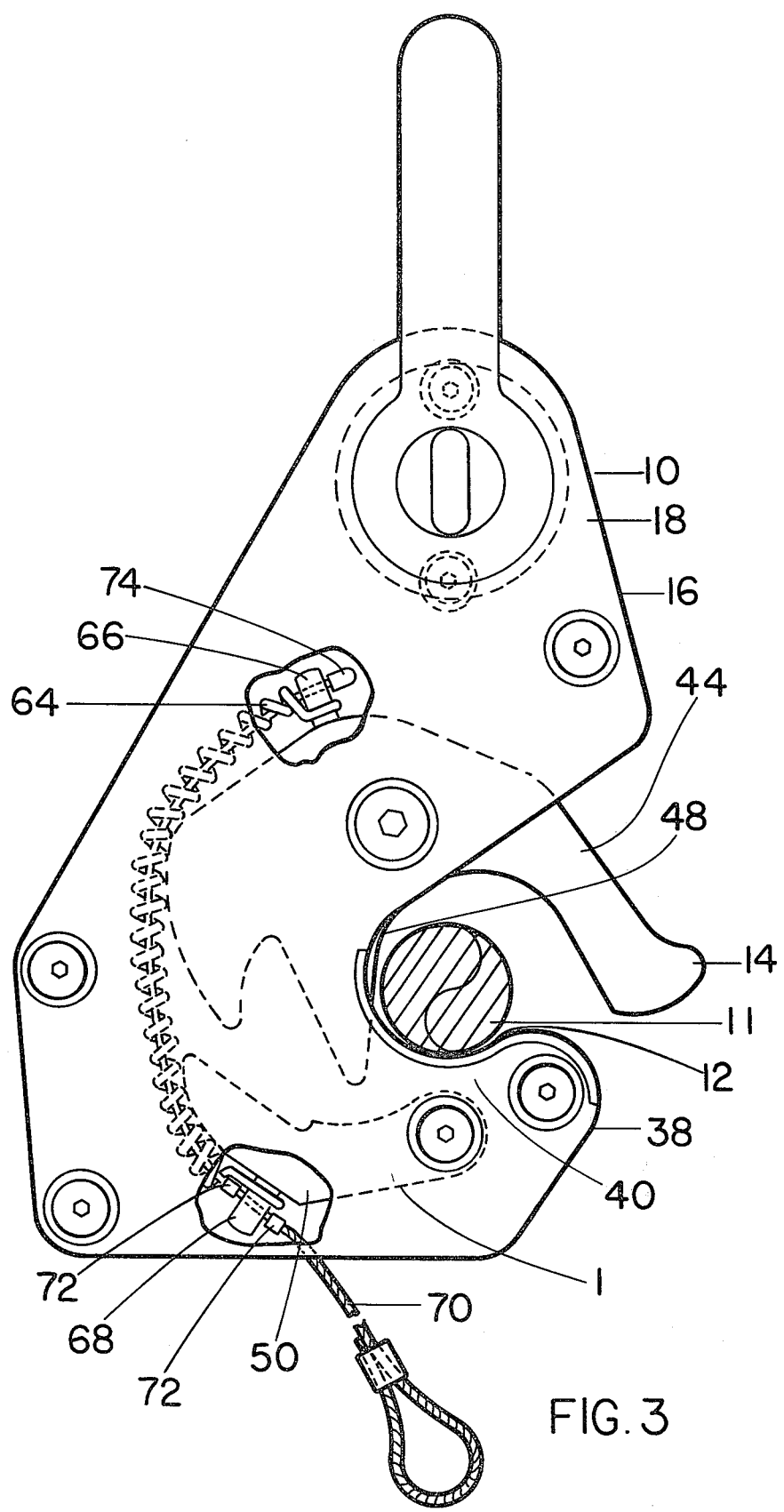
FIG. 3 is an elevation like FIG. 1 but showing the hook assembly while being armed by pulling the lanyard and disengaging the release latch from the cam.

The latch 50 is held in the locking position relative to the cam 44 by resilient means such as a coil spring 64 fastened at one end to a post 66 mounted on the edge of the cam and a post 68 mounted on the edge of the latch. A flexible elongated actuating member such as a lanyard 70 of steel cable is attached to the latch 50 as by passing the cable through a hole in the post 68 and having stops 72 swaged at either side of the post. The lanyard 70 may also extend through the coil spring 64 and a hole in the post 66 to an end stop 74 swaged on the end of the lanyard. The minimum distance the end stop 74 can be spaced from the post 66 is the distance required to permit the release latch 50 to become disengaged from the cam 44 as shown in FIG. 3 while the cam ejecting surface 48 is in engagement with the davit ring 11 as shown in FIG. 3.

Figure 4:
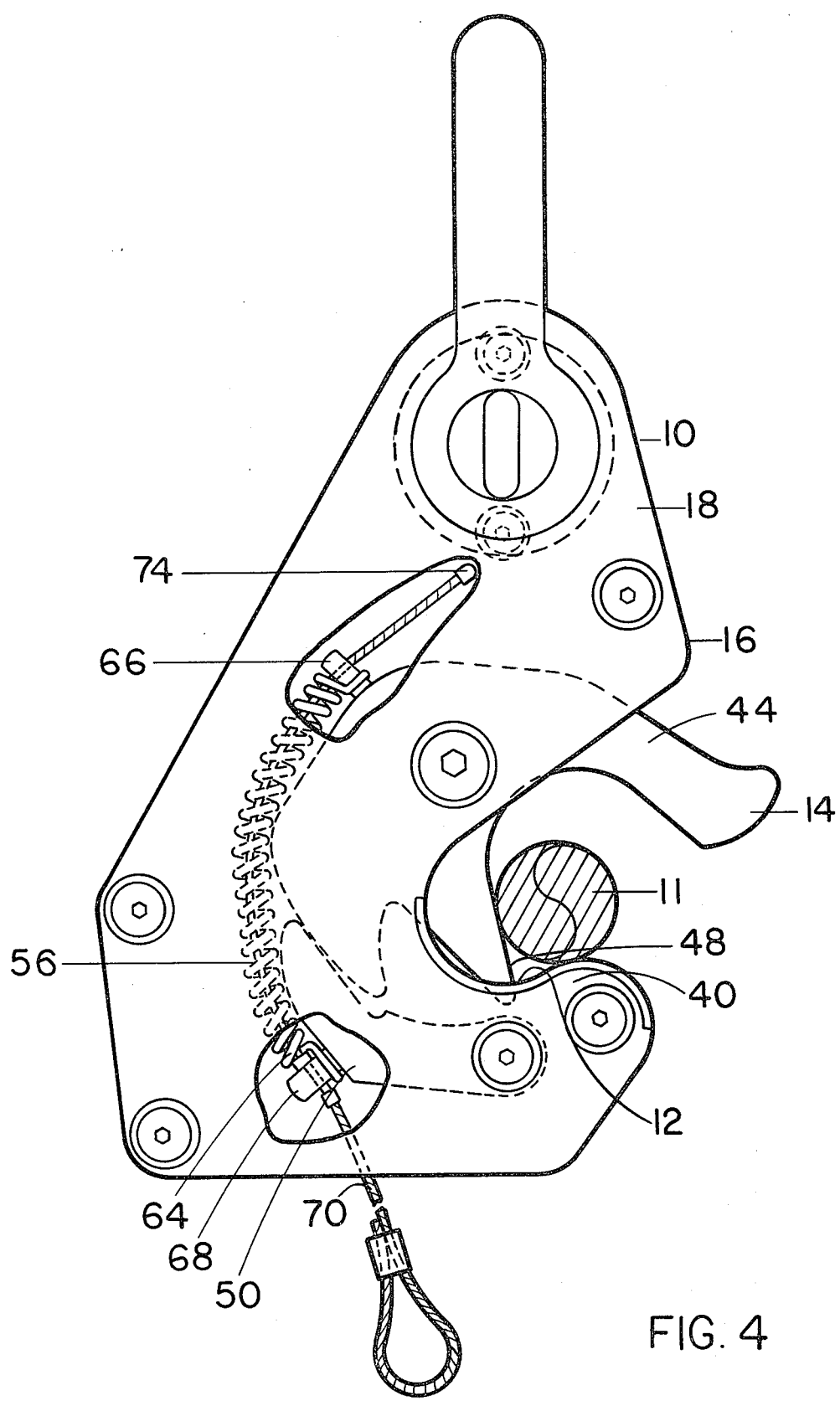
FIG. 4 is a view like FIG. 3 showing the hook assembly in the armed condition with the cam ejecting surface partially ejecting the davit ring.

In operation, the shackle 32 is fastened to the davit fall (not shown) and the davit ring 11 is locked in place by the locking jaw 14 as shown in FIGS. 1 and 2. The releasable latch 50 is held by the coil spring 64 against the cam 44 with the projection 62 on the cam edge surface 58 in engagement with the indentation 60 in the locking edge 56 of the latch. Referring to FIG. 3, the hook assembly 10 is shown with the lanyard 70 pulled to disengage the latch 50 from the cam 44 with the davit ring 11 retained in position by the raft load. In this way, the hook assembly 10 is armed for ejection of the ring 11 and upon release of the the lanyard 70, the spring 64 returns the latch 50 to a position with the locking edge 56 in sliding engagement with another edge of the cam 44 as shown in FIG. 4. In this position the cam ejecting surface 48 is urged against the davit ring 11 and as the load is released, the ring is pushed out of the hook retaining eye 12 as shown in FIG. 4. This does not occur until the raft has landed on the water and the raft load is zero or a very small amount.

Figure 5:
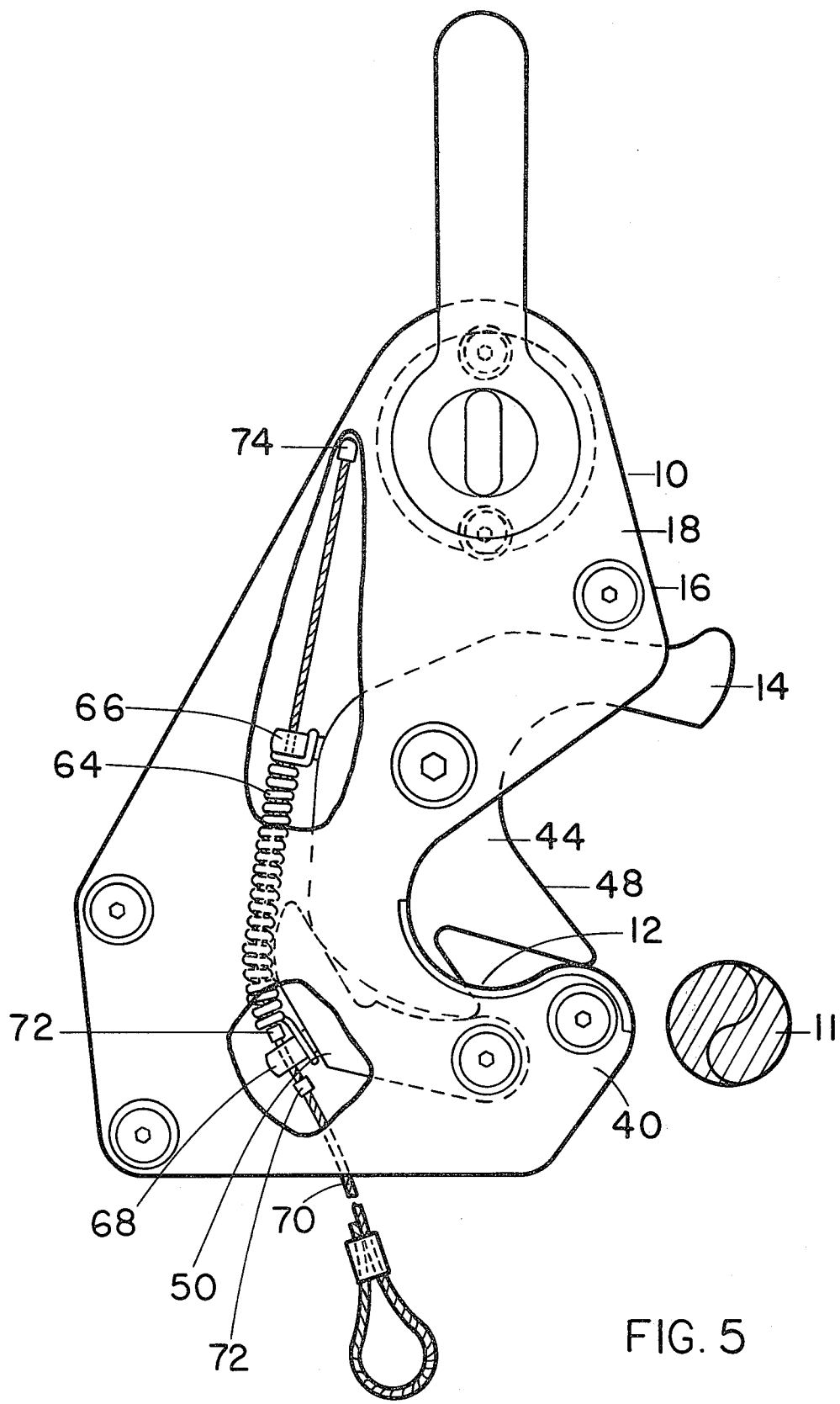
FIG. 5 is a view like FIG. 4 showing the cam ejecting surface after ejection of the davit ring from the hook assembly.

Referring to FIG. 5, the hook assembly 10 is shown in the condition after the cam ejecting surface 48 has urged the davit ring 11 over the hook jaws 40 and 42 and out of the hook retaining eye 12 so that the life raft may float on the water and not be jerked or pulled by the davit fall fastened to the ship or oil well platform. Preferably the cam ejecting surface 48 has a predetermined slope in the ring ejecting position for sliding the ring 11 out of the load retaining eye 12 by gravity.

As shown in FIG. 5, the lanyard end stop 74 is spaced a substantial distance from the post 66 as the spring 64 is contracted. In the event that the spring 64 would break or otherwise not function, the lanyard 70 can be pulled through the post 66 until the stop 74 engages the post at which time the cam 44 will be rotated to the position shown in FIG. 5. This movement is also made possible by the rotation of the latch 50 downward to permit rotation of the cam 44 to the ejecting position as shown in FIG. 5.

After the hook assembly 10 has been removed from the davit ring 11 of one raft it may be lifted by a davit and locked on a ring of another raft. This is accomplished by manually inserting the ring 11 which is not under load into the hook retaining eye 12, as shown in FIG. 4, and then pulling the locking jaw 14 towards the hook jaws 40 and 42 to the position shown in FIG. 1 where the projection 62 on the cam edge surface 58 engages the indentation 60 in the locking edge 56 of the releasable latch 50. The hook assembly 10 is then ready for use in the manner described hereinabove.

With the foregoing disclosure in mind, many and varied obvious modifications of this invention will become readily apparent to those of ordinary skill in the art.

We claim:

1. An automatic hook assembly for locking a ring in a hook load retaining eye when loaded and ejecting the ring from the eye upon release of the load comprising a hook body having a hook portion, a hook supporting portion spaced from said hook portion, a locking and ejecting cam pivotally mounted on said hook body between said hook portion and said supporting portion, said cam having a locking jaw movable into a locking position at said load retaining eye, a releasable latch pivotally mounted on said body, said latch being engageable with said cam to lock said jaw in said locking position, an actuating member connected to said latch for arming said hook assembly by rotating said latch out of engagement with said cam, said cam having an ejecting surface for engagement with said ring, resilient means connected to said releasable latch and to said cam for yieldingly urging said cam in a direction to maintain said releasable latch in said locking position prior to arming of said assembly and in the same direction after arming to move said hook jaw out of said locking position and press said cam ejecting surface against said ring for ejecting said ring upon release of loading pressure by said hook on said hook portion of said body.

2. A hook assembly according to claim 1 wherein said hook body further comprises spaced-apart side plates with said cam and latch pivotally mounted therebetween.

3. A hook assembly according to claim 1 wherein said hook supporting portion has an aperture for receiving a shackle pin for mounting a shackle on said assembly.

4. A hook assembly according to claim 1 wherein said resilient means is a coil spring having one end connected to said cam and the other end connected to said latch.

5. A hook assembly according to claim 1 wherein said actuating member is a lanyard connected to said releasable latch.

6. A hook assembly according to claim 5 wherein said resilient means is a coil spring surrounding said lanyard and connected to said latch at one end and to said cam at the other end.

7. A hook assembly according to claim 6 wherein said lanyard is slidably connected to said cam and has a stop member for engagement with the cam to provide for manual ejection of the ring.

8. A hook assembly according to claim 1 wherein said cam ejecting surface has a predetermined slope in the ejecting position for sliding the ring out of the load retaining eye by gravity.

9. A hook assembly according to claim 1 wherein said latch has a locking edge including an indentation in said edge and said cam has an edge surface including a projection on said surface for engagement with said indentation in said locking position of said assembly.

* * * * *